(12) United States Patent
Hoyek et al.

(10) Patent No.: US 8,087,001 B2
(45) Date of Patent: Dec. 27, 2011

(54) COMPUTER-IMPLEMENTED SYSTEMS AND METHODS FOR SOFTWARE APPLICATION TESTING

(75) Inventors: Nabil Mounir Hoyek, Cary, NC (US); Christina Charisse McCain, Raleigh, NC (US); Oita Kayonna Cheston Coleman, Apex, NC (US)

(73) Assignee: SAS Institute Inc., Cary, NC (US)

( * ) Notice: Subject to any disclaimer, the term of this patent is extended or adjusted under 35 U.S.C. 154(b) by 1174 days.

(21) Appl. No.: 11/771,271

(22) Filed: Jun. 29, 2007

(65) Prior Publication Data

US 2009/0007078 A1  Jan. 1, 2009

(51) Int. Cl.
 *G06F 9/44* (2006.01)
(52) U.S. Cl. ..................................................... 717/124
(58) Field of Classification Search .................... 717/124
 See application file for complete search history.

(56) References Cited

U.S. PATENT DOCUMENTS

| | | | |
|---|---|---|---|
| 5,086,393 A | 2/1992 | Kerr et al. |
| 5,475,843 A | 12/1995 | Halviatti |
| 5,528,735 A | 6/1996 | Strasnick et al. |
| 5,566,291 A | 10/1996 | Boulton et al. |
| 5,669,000 A | 9/1997 | Jessen et al. |
| 5,724,262 A | 3/1998 | Ghahramani |
| 5,892,947 A | 4/1999 | DeLong et al. |
| 5,905,856 A | 5/1999 | Ottensooser |
| 6,002,869 A | 12/1999 | Hinckley |
| 6,031,990 A | 2/2000 | Sivakumar et al. |
| 6,219,839 B1 | 4/2001 | Sampsell |
| 6,222,557 B1 | 4/2001 | Pulley, IV et al. |
| 6,237,138 B1 | 5/2001 | Hameluck et al. |
| 6,259,451 B1 | 7/2001 | Tesler |
| 6,301,579 B1 | 10/2001 | Becker |
| 6,326,985 B1 | 12/2001 | Tazoe et al. |
| 6,400,366 B1 | 6/2002 | Davies et al. |
| 6,405,364 B1 | 6/2002 | Bowman-Amuah |
| 6,449,744 B1 | 9/2002 | Hansen |
| 6,480,194 B1 | 11/2002 | Sang'udi et al. |
| 6,513,154 B1 | 1/2003 | Porterfield |
| 6,526,526 B1 | 2/2003 | Dong et al. |
| 6,529,216 B1 | 3/2003 | Moore et al. |
| 6,694,288 B2 | 2/2004 | Smocha et al. |
| 6,725,399 B1 | 4/2004 | Bowman |
| 6,775,819 B1 | 8/2004 | Hardikar et al. |
| 6,792,460 B2 | 9/2004 | Oulu et al. |
| 6,842,176 B2 | 1/2005 | Sang'udi et al. |
| 6,898,556 B2 | 5/2005 | Smocha et al. |
| 6,907,382 B2 | 6/2005 | Urokohara |

(Continued)

OTHER PUBLICATIONS

Ganci, John et al., "Rational Application Developer V6 Programming Guide", IBM Redbooks, 21 page of Table of Contents and pp. 4, 5, 503-524 and 1087-1099 [Jun. 2, 2005].

(Continued)

*Primary Examiner* — Anna Deng
*Assistant Examiner* — Junchun Wu
(74) *Attorney, Agent, or Firm* — Jones Day

(57) ABSTRACT

Computer-implemented systems and methods for testing one or more software applications. For example, a system and method can be configured to perform a comparison between test data results and benchmark test data in order to determine test result differences between the received test data results and the retrieved benchmark test data. Testing criteria is applied to the determined test result differences in order to identify test deviations from the benchmark test data.

10 Claims, 19 Drawing Sheets

U.S. PATENT DOCUMENTS

| | | | |
|---|---|---|---|
| 6,934,934 B1 * | 8/2005 | Osborne et al. | 717/126 |
| 7,000,224 B1 * | 2/2006 | Osborne et al. | 717/125 |
| 7,068,267 B2 | 6/2006 | Meanor et al. | |
| 7,082,381 B1 | 7/2006 | Saghier et al. | |
| 7,197,370 B1 | 3/2007 | Ryskoski | |
| 7,222,265 B1 | 5/2007 | LeSuer et al. | |
| 7,237,231 B2 | 6/2007 | Lambert | |
| 7,313,564 B2 | 12/2007 | Melamed et al. | |
| 7,577,769 B2 | 8/2009 | Cobb et al. | |
| 7,689,973 B2 * | 3/2010 | Kwong et al. | 717/126 |
| 2001/0028359 A1 | 10/2001 | Muraishi et al. | |
| 2002/0029377 A1 | 3/2002 | Pavela | |
| 2003/0135843 A1 | 7/2003 | Sluiman et al. | |
| 2004/0073890 A1 * | 4/2004 | Johnson et al. | 717/124 |
| 2004/0107415 A1 | 6/2004 | Melamed et al. | |
| 2004/0139385 A1 | 7/2004 | Sakaue | |
| 2005/0015666 A1 | 1/2005 | Kamani et al. | |
| 2005/0154557 A1 | 7/2005 | Ebert | |
| 2005/0210397 A1 | 9/2005 | Kanai et al. | |
| 2005/0229043 A1 * | 10/2005 | Nasuti et al. | 714/38 |
| 2005/0240618 A1 | 10/2005 | Nickerson et al. | |
| 2005/0278597 A1 * | 12/2005 | Miguelanez et al. | 714/738 |
| 2005/0283736 A1 | 12/2005 | Elie | |
| 2006/0265368 A1 | 11/2006 | Nickerson et al. | |
| 2006/0265492 A1 | 11/2006 | Morris | |
| 2006/0277102 A1 * | 12/2006 | Agliozzo | 705/14 |
| 2007/0027652 A1 | 2/2007 | Hosagrahara | |
| 2007/0083854 A1 | 4/2007 | Mayer-Ullmann et al. | |
| 2007/0250621 A1 * | 10/2007 | Hillier | 709/224 |
| 2008/0104573 A1 * | 5/2008 | Singla et al. | 717/120 |
| 2008/0104577 A1 * | 5/2008 | Holden | 717/126 |
| 2008/0127101 A1 | 5/2008 | Anafi et al. | |
| 2009/0248315 A1 * | 10/2009 | Pardo et al. | 702/19 |

OTHER PUBLICATIONS

"Java Static Analysis, Code Review, Unit Testing, Runtime Error Detection", http://www.parasoft.com/jsp/products/jtest.jsp;jsessionid=aaacAMw30bA6G4?ITEMId=14, 1pg. (Jul. 20, 2009).

"Parasoft Jtest—Now Available With Test Case Sniffer", http://web.archive.org/web/20060404223614/http://parasoft.com/jsp/products/home.jsp?jproduct=Jtest, 4 pp. (Apr. 4, 2006).

Dockendorf, Scott, "Unit Testing and Generating Source Code for Unit Test Frameworks Using Visual Studio 2005 Team System", http://microsoft.com/en-us/library/ms364064(VS.80.printer).aspx, 13 pp. (Sep. 2005).

Buwalda, Hans et al., "Getting Automated Testing Under Control," Software Testing & Quality Engineering, pp. 39-44, Nov./Dec. 1999.

Buwalda, Hans, "It can be complicated to automate model-based testing. Here's how to employ action words to get the job done.", STQE Magazine, Software Quality Engineering, pp. 42, 44, 46-47, Mar./Apr. 2003.

"WHEN-D4.2 Test Automation Approach", B-K Medial Group, Issue 1.0, pp. 1-14, Jul. 5, 2000.

Nasuti, William John et al., U.S. Appl. No. 10/811,789, filed Mar. 29, 2004 entitled "System and Method for Software Testing".

Squires, Charles W. et al., U.S. Appl. No. 11/522,710, filed Sep. 18, 2006 entitled "Computer-Implemented System for Generating Automated Tests From a Web Application".

Walker, Mark H. et al., "Microsoft Office Visio 2003 Inside Out", Microsoft Press, 3 pp. [Oct. 29, 2003].

* cited by examiner

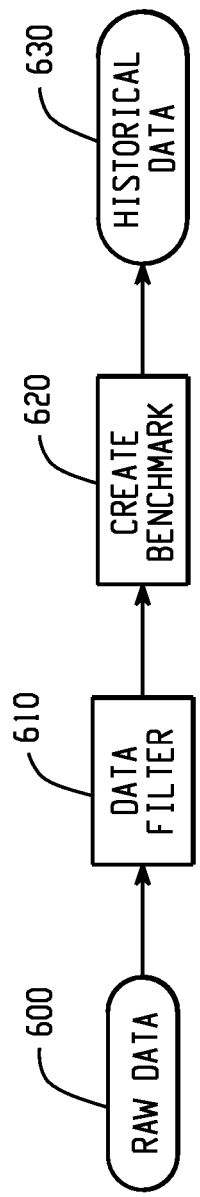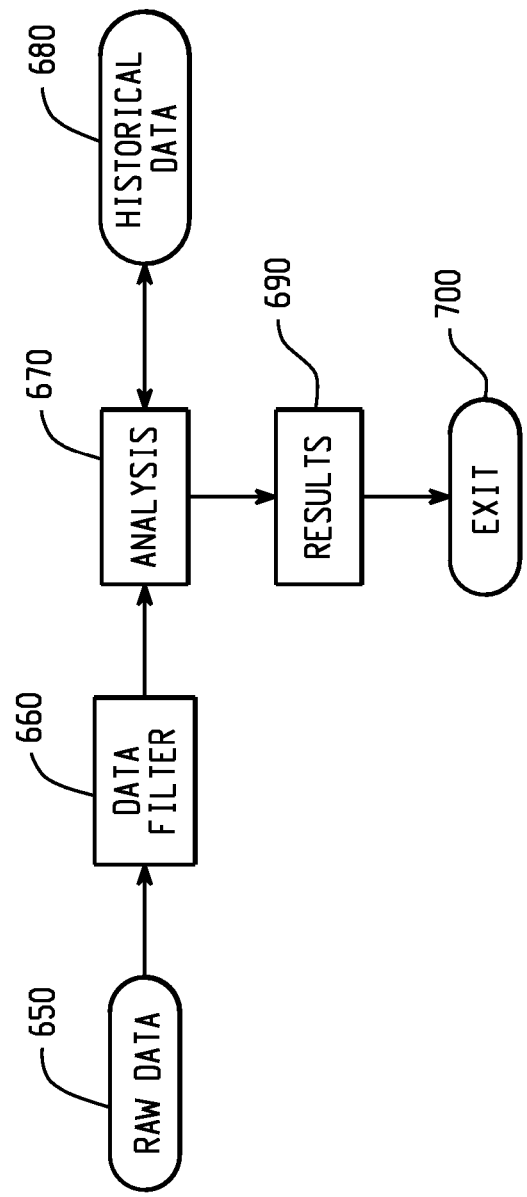

Analysis of Benchmark to Raw Data
Value Comparison Results for Transactions

| Transaction | Benchmark Average | Raw Data Average | Difference | Percent Difference |
|---|---|---|---|---|
| DisplayGraphDAV | 0.2427 | 0.3567 | 0.1140 | 46.9768 |
| DrlDwnPublishFldrDAV | 0.9194 | 0.9993 | 0.0800 | 8.6988 |
| Extra2 | 0.6497 | 8.9105 | 8.2408 | 1272 |
| Group | 0.3196 | 1.5595 | 1.2399 | 387.9782 |
| Home | 0.1726 | 5.0194 | 4.8468 | 2809 |
| LogOff | 0.1761 | 0.3089 | 0.1328 | 75.3674 |
| LogOn | 1.9776 | 5.6096 | 3.6320 | 183.6576 |
| OpenPkgDAV | 0.3386 | 0.7740 | 0.4354 | 128.5843 |
| PortalPageExtra2 | 0.3892 | 0.7632 | 0.3740 | 96.1096 |
| Portlets | 0.4242 | 2.7676 | 2.3434 | 552.4338 |
| UpLvlPublishDAV | 0.6458 | 0.7082 | 0.0625 | 9.6713 |

Fig. 15

| Analysis of Portal Log On Benchmarks |||||
|---|---|---|---|---|
| Log On Transaction Data |||||
| Date | Average | Maximum | Minimum | Std. Dev. |
| 07/24 | 8.7432 | 13.4412 | 1.2305 | 1.1809 |
| 07/25 | 8.7432 | 14.053 | 1.2305 | 1.1809 |
| 07/26 | 9.1303 | 15.2311 | 1.2305 | 1.1809 |
| 07/27 | 8.7432 | 15.3469 | 1.2305 | 1.1809 |
| 07/28 | 9.9742 | 16.4437 | 1.2305 | 1.1809 |
| 07/29 | 15.1453 | 31.1754 | 2.0313 | 2.2777 |
| 07/30 | 13.5481 | 26.1167 | 7.0218 | 3.0703 |
| 07/31 | 16.545 | 28.1208 | 2.1585 | 2.7835 |
| 08/01 | 16.7773 | 27.392 | 2.1698 | 2.8074 |

Fig. 16

Analysis of Portal Log On Benchmarks

System Resources Statistics

| Date | Processor | Handle Count | Thread Count |
|---|---|---|---|
| 07/24 | 40.314 | 14217.25 | 896.819 |
| 07/25 | 40.115 | 14301.28 | 915.264 |
| 07/26 | 39.822 | 14330.33 | 923.000 |
| 07/27 | 25.329 | 19846.21 | 1157.435 |
| 07/28 | 23.136 | 21148.77 | 1366.122 |
| 07/29 | 26.456 | 17478.55 | 1206.513 |
| 07/30 | 25.229 | 15506.7 | 1051.263 |
| 07/31 | 38.846 | 16235.48 | 988.658 |
| 08/01 | 50.351 | 16726.94 | 958.599 |

…

COMPUTER-IMPLEMENTED SYSTEMS AND METHODS FOR SOFTWARE APPLICATION TESTING

CROSS-REFERENCE TO RELATED APPLICATIONS

This application contains subject matter that may be considered related to subject matter disclosed in U.S. patent application Ser. No. 10/811,789, (entitled System And Method For Software Testing and filed on Mar. 29, 2004) and U.S. patent application Ser. No. 11/522,710, (entitled Computer-Implemented System For Generating Automated Tests From A Web Application and filed on Sep. 18, 2006), of which the entire disclosure (including any and all figures) of these applications is incorporated herein by reference.

TECHNICAL FIELD

This document relates generally to software testing and more particularly to computer-implemented testing of software applications.

BACKGROUND

Software testers are tasked with determining whether software applications will perform in real-world environments. Testing involving a single user utilizing a software application is problematic, and the difficulty increases when testing involves multiple user software applications. For example, an increased load due to multiple users can cause serious and unpredictable problems with application performance. Accordingly, it may be difficult to determine if an application is ready to operate under the loads of a multiple user environment.

Currently, software application testing is performed using testing software that creates large amounts of complex data about the software application(s) being tested. This information then has to be deciphered before it can be used to determine how the system under test has performed. Furthermore, they are limited in that they only provide a snapshot of the current run of a test. There is no automated process for tracking data from previous tests. The current procedure can be time consuming and also error prone because the tester is forced to use rudimentary means to analyze the performance of an application over time. Additionally, the tester is left to making a judgment call of whether the test run was successful.

SUMMARY

In accordance with the teachings provided herein, systems and methods for operation upon data processing devices are provided for testing one or more software applications. For example, a system and method can be configured to perform a comparison between test data results and benchmark test data in order to determine test result differences between the received test data results and the retrieved benchmark test data. Testing criteria is applied to the determined test result differences in order to identify test deviations from the benchmark test data.

As another example, a system and method can be configured to receive test data results that were generated during testing of a software application. Benchmark test data is retrieved from a historical test data store. After retrieving the benchmark test data, a comparison is automatically performed between the received test data results and the retrieved benchmark test data in order to determine test result differences between the received test data results and the retrieved benchmark test data. Testing criteria is automatically applied to the determined test result differences in order to identify test deviations from the benchmark test data. A software tester or a computer program is provided with the identified test deviations. The identified test deviations can also be stored in a computer-readable storage device.

As yet another example, a method and system can be configured to be used along side of other performance testing tools. The method and system provides a user with the ability to compare current test transaction data to benchmark data. The data is analyzed against predefined thresholds of acceptable deviation. Historical test data can be collected to determine trends. These trends are then used to predict future performance of the software application(s) under test.

BRIEF DESCRIPTION OF THE DRAWINGS

FIG. 10 is a block diagram depicting an example of an operational scenario for creating and storing benchmark data.

FIG. 11 is a block diagram depicting a software testing process using historical data.

FIG. 15 shows an example of an analysis that compares benchmark data to raw data.

FIG. 16 shows an example of historical data analysis containing details for portal log on benchmarks.

DETAILED DESCRIPTION

Figure 1:
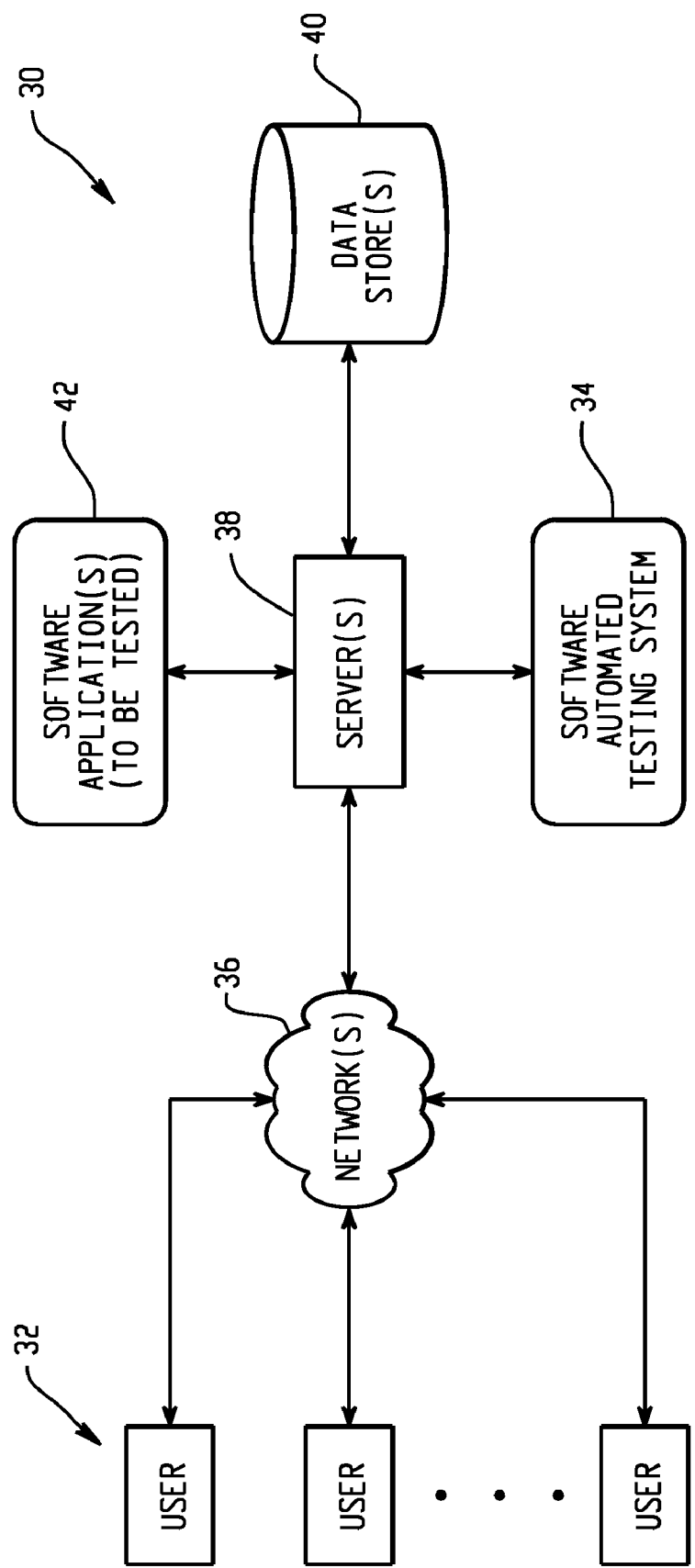
FIG. 1 is a block diagram depicting an environment wherein users can interact with a software automated testing system.

FIG. 1 depicts at 30 a computer environment wherein users 32 can interact with a software automated testing system 34 to facilitate software performance testing. The users 32 can interact with the software automated testing system 34 through a number of ways, such as over one or more networks 36. One or more server(s) 38 accessible through the network (s) 36 can host the software automated testing system 34. Server(s) 38 can also host software applications), which include software application(s) to be tested 42.

The software automated testing system 34 can be an integrated web-based reporting and analysis tool that provides users flexibility and functionality for performing performance testing analysis. One or more data stores 40 can store the data to be analyzed by the system 34 as well as any intermediate or final data generated by the system 34.

Figure 2:
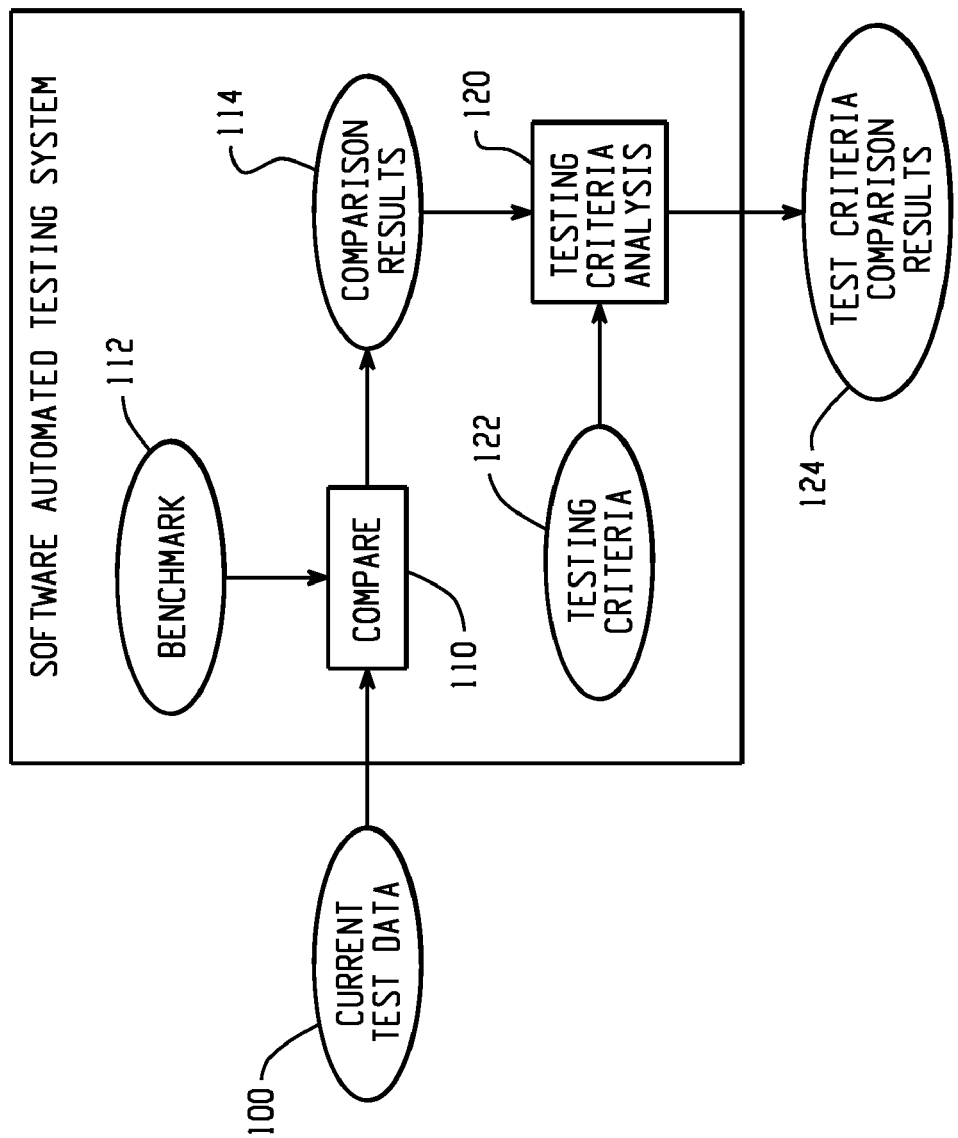
FIG. 2 is a block diagram depicting a software automated testing system for performing software performance testing analysis.

FIG. 2 depicts a software automated testing system for performing software performance testing analysis. Current test data 100 is received by the software automated testing system via process 110, and the software automated testing system automatically compares the current test data 110 to benchmark data 112, and in the process generates comparison results 114. At process 120, comparison results 114 are automatically assessed with respect to performance testing criteria 122. Finally, the software automated testing system outputs the test criteria comparison results 124.

Figure 3:
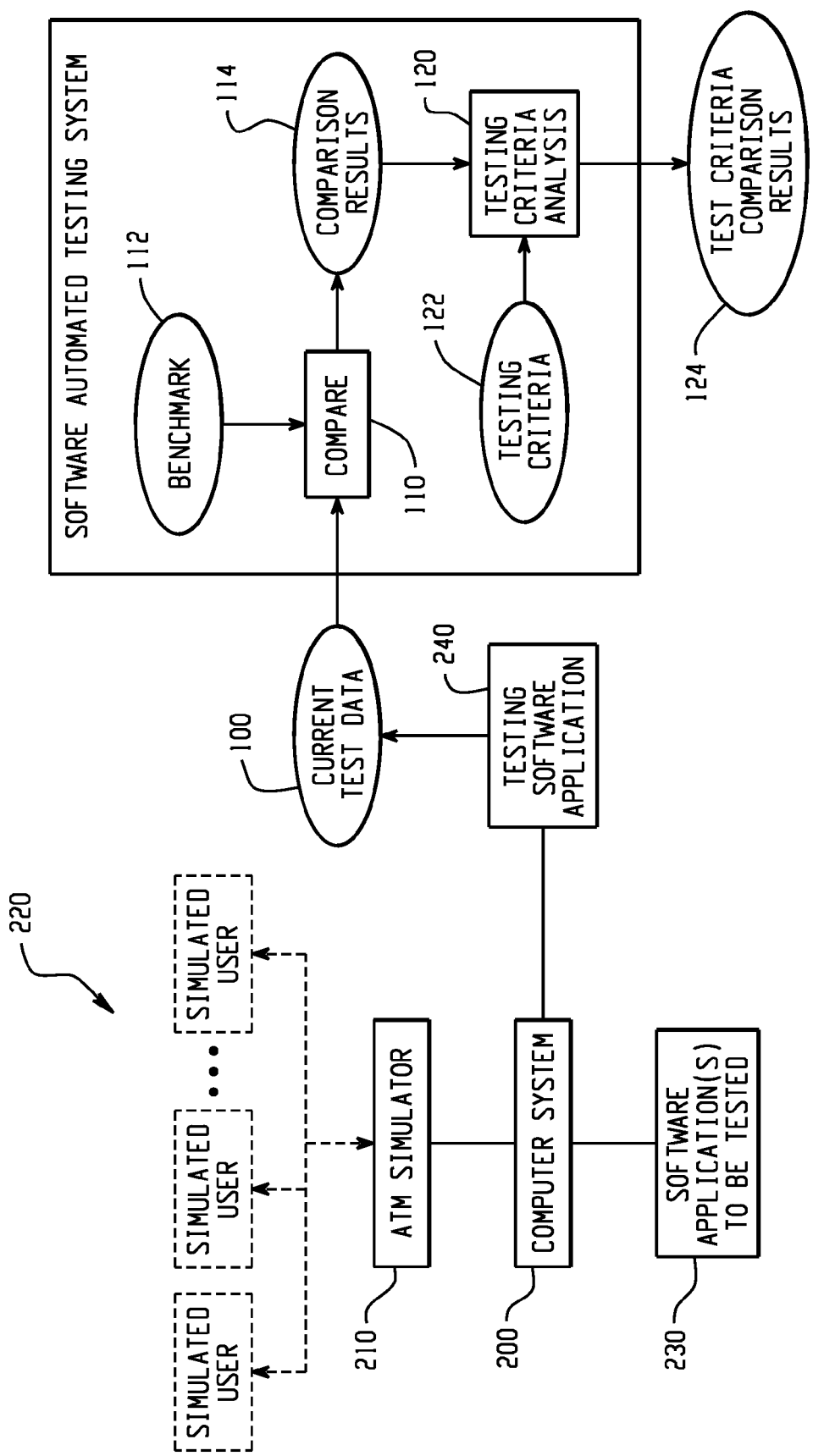
FIG. 3 is a block diagram depicting use of a software automated testing system within the context of testing an automated teller machine (ATM) computer system.

FIG. 3 depicts an example of a software automated testing system being used to analyze test data 100 that was generated within an automated teller machine (ATM) test simulation environment. In FIG. 3, the testing environment simulates client-side application(s) 230 that are designed to interface with an ATM machine. The testing environment in this example tests the software application(s) 230 under many different conditions. This is to simulate the real world wherein the software application(s) will have to handle peak times—such as Monday morning—during which the load is much higher than normal. Also in the real world, the software application(s) 230 may have to interact with hundreds of ATM machines. However, it is not practical to have a testing pool of hundreds of ATMs to test such conditions. Accordingly the computer system 200 in this example includes an ATM simulator 210 to simulate ATM machines interacting with users 220; the client-side software applications to be tested; and testing software application 240 which collects the test data resulting from simulating a large number of transactions. (An example of a testing software application 240 is the LoadRunner® software tool that is available from Hewlett-Packard Development Company). After debugging a problem in the application, managers can check whether the problem persists by reproducing the same situation, with the same type of user interaction.

Simulated users 220 are scripted to simulate real-life transactions in ATM simulator 210. As simulated users 220 perform virtual transactions, the testing software application 240 creates the current test data 100 and provides it to the software automated testing system. In this example, vast amounts of raw data output are generated after each scenario is run and can include whether functions of the software application(s) 230 worked or did not work. The raw data output can also include other information, such as data about the performance of the ATM software system at a particular a user load level. The results can then be analyzed in detail to explore the reasons for particular behavior.

Interpreting transaction data generated across multiple runs through use of previous software performance testing systems can be quite difficult. For example, the limited variables measured make it difficult to provide a complete picture of system performance, especially because each transaction captures essentially a snapshot in time. Because data from each scenario only represents a single test, it is difficult to place that data in its proper context. Moreover, current testing approaches for tracking data from previous sets is time consuming and also error prone because the tester is forced to use rudimentary and manual means to analyze the performance of an application over time. Additionally, the tester is left to making a "judgment call," with no objective basis to determine whether the test run was successful.

As shown in the example of FIG. 3, a software automated testing system can be used to facilitate analysis of the vast amount of test data 100 generated through a test run involving the software application(s) 230. The software automated testing system automatically performs a comparison of the test data 100 with respect to benchmark data 112. The comparison is then automatically assessed relative to performance testing criteria 122 in order to determine which performance aspects of the software application(s) 230 performed satisfactorily and which performance aspects did not.

The software automated testing system of FIG. 3 allows an automatic analysis of data generated from each iteration in the benchmarking process against benchmark standards to determine whether a given performance run is acceptable, or against historical data for detecting trends in system performance. Additionally, such comparisons form a reliable and objective basis for predicting future system performance, precluding or reducing the requirement of relying on subjective "judgment call" analysis. Stated otherwise, these processes take all or most of the guesswork out of analyzing performance data, thereby speeding up the process of finding performance problems and helping to predict the future performance of an application. These processes eliminate the requirement of non-automated data acceptability evaluation, processing and comparison, which can be time-consuming and error-prone.

Figure 4:
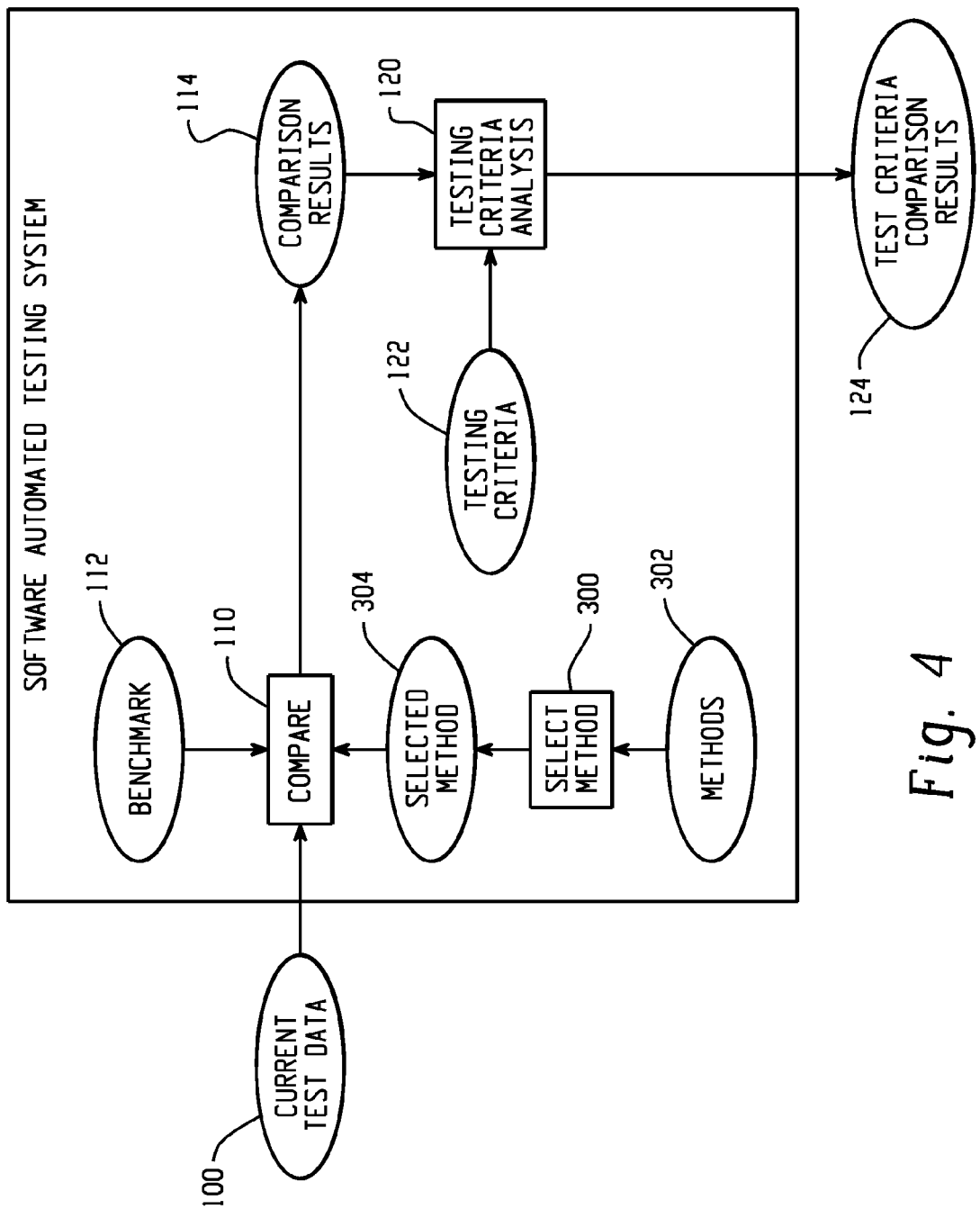
FIG. 4 is a block diagram illustrating that a testing process can be augmented to include selecting a comparison method for a software automated testing system.

It should be understood that similar to the other processing flows described herein, the steps and the order of the steps in the processing flow of FIG. 3 may be altered, modified, removed and/or augmented and still achieve the desired outcome. For example, FIG. 4 illustrates that a software automated testing system can be augmented to include a process 300 for selecting a comparison method for determining how test data results are to be compared with benchmark data. For example, a user can select via process 300 a particular method 304 from a list of possible test comparison methods 302. Examples of test comparison methods 302 include:

an absolute test comparison method: (x−y)
where x is the Raw Data Average and y is the Benchmark Average;
percentage test comparison method: ((x−y)/x)×100%); or
relative difference between transactions test comparison method: (y/x), Selection of a comparison method provides for consistent analysis of current test data against benchmarks, and can help highlight performance variation characteristics over time for system performance analysis.

Figure 5:
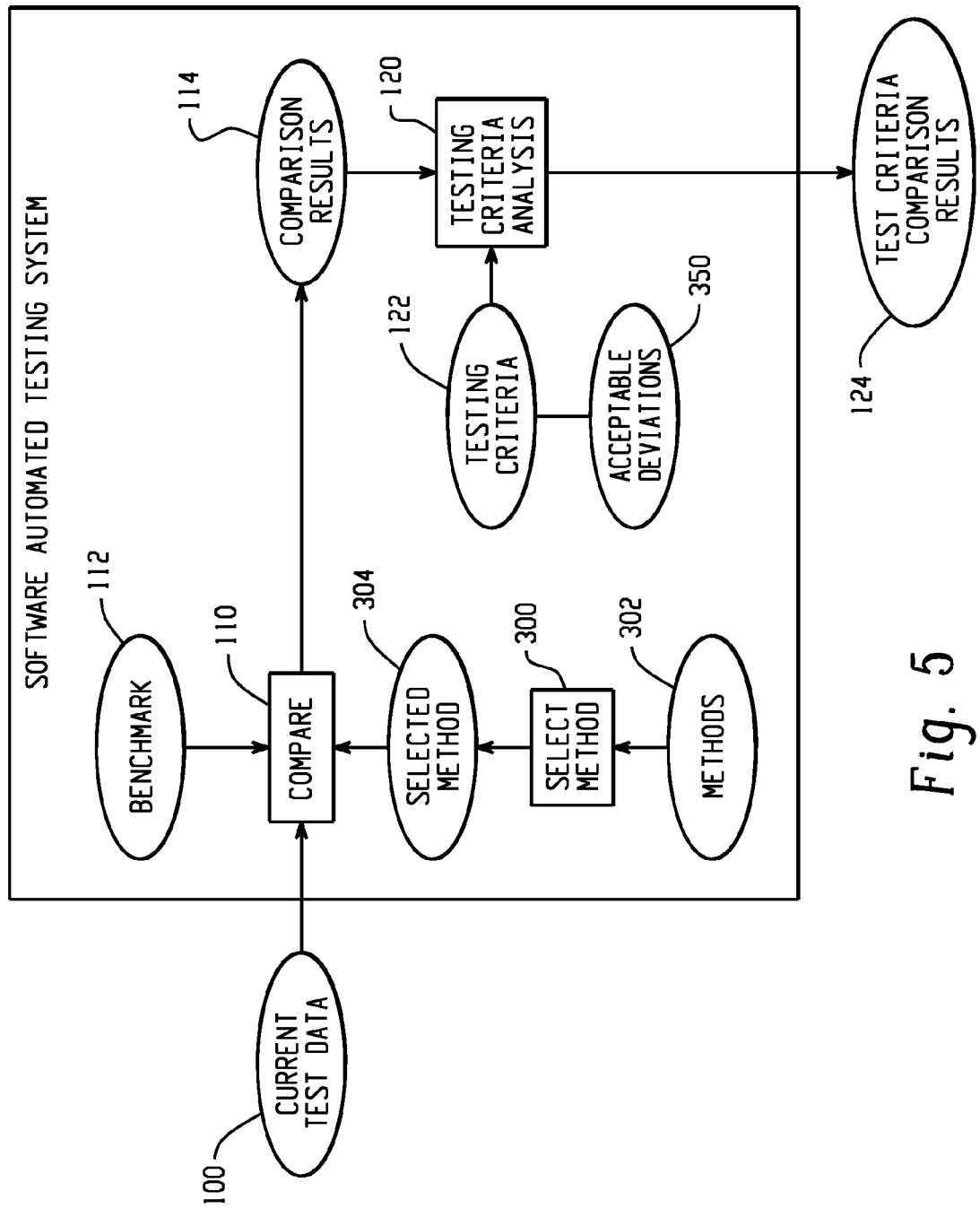
FIG. 5 is a block diagram depicting use of acceptable deviations as testing criteria.

FIG. 5 shows a software automated testing system which uses acceptable deviations data 350 as testing criteria 122. The acceptable deviations data 350 determines whether testing criteria analysis process 120 reports an acceptable or unacceptable test result. If a test result falls outside of an acceptable range of deviation, a report may be generated to notify the user (e.g., automatically via e-mail) that one or more unacceptable performance test outcomes have occurred. By monitoring current test data for instances in which comparison results fall outside of an acceptable range of deviation, users can rapidly assess whether particular changes to or conditions of the computer system under test have system performance problems.

Figure 6:
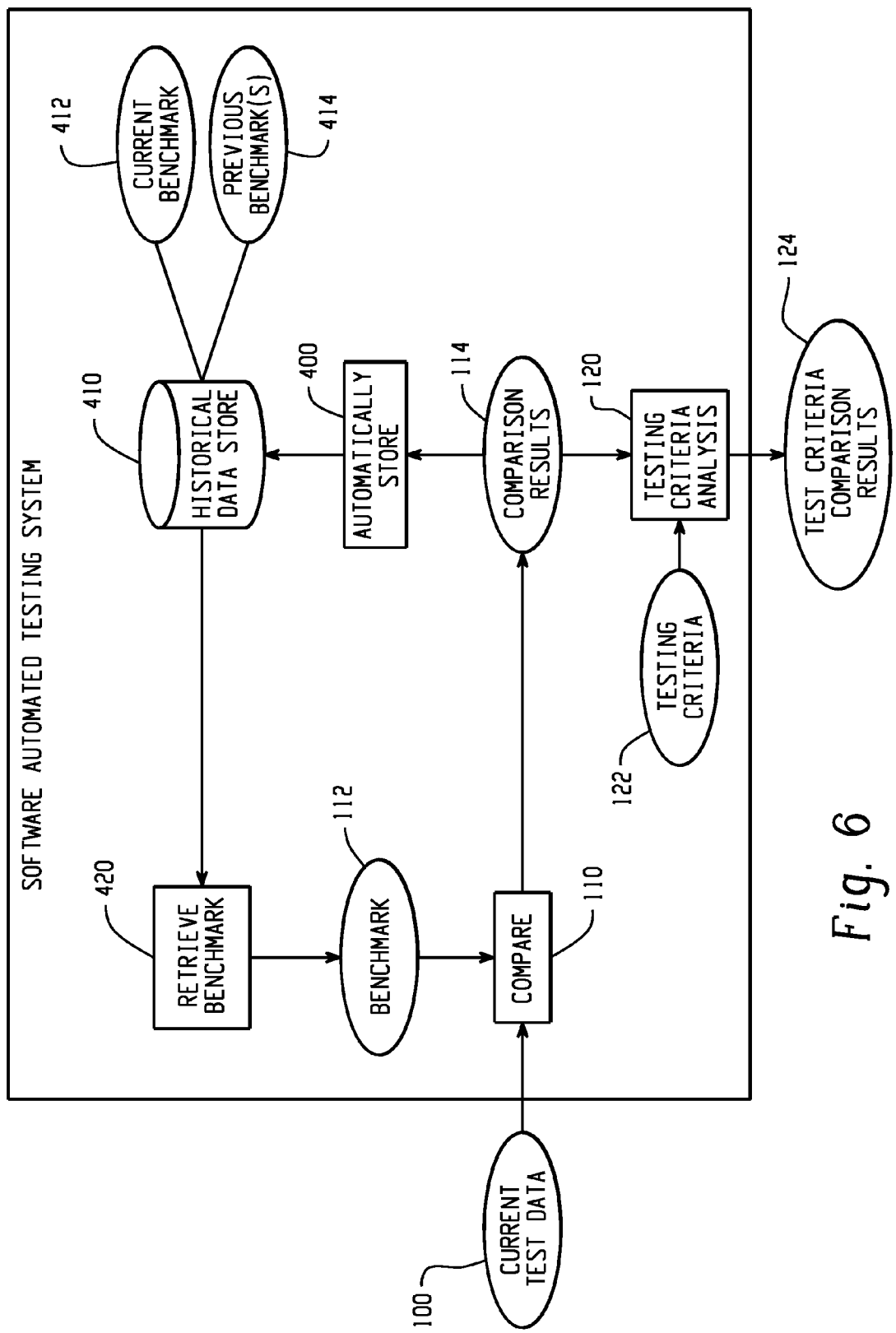
FIG. 6 is a block diagram depicting automatically storing comparison results in a historical data store.

FIG. 6 shows a process for automatically storing via process 400 comparison results in a historical data store 410. Historical data store 410 contains current benchmark data 412 as well as previous benchmark(s) 414 (e.g., benchmark data that have been generated through previous tests of the software application or system). Thus, previous and current benchmarks are kept in a single place, providing efficient access, analysis and comparison.

In FIG. 6, a software automated testing system retrieves via process 420 benchmark data from the historical data store 410, and compares the retrieved benchmark data to current test data. Automatic storage of comparison results in historical data store 410 allows access to test data from past test runs, and can be used in providing an index of system performance characteristics over time that can be analyzed for, e.g., historical performance trend detection or future performance forecasting. It should be understood that the user can select to have the most recent benchmark 412 retrieved from the historical data store 410 or can retrieve one or more other benchmarks 414 for comparison at process 110.

Figure 7:
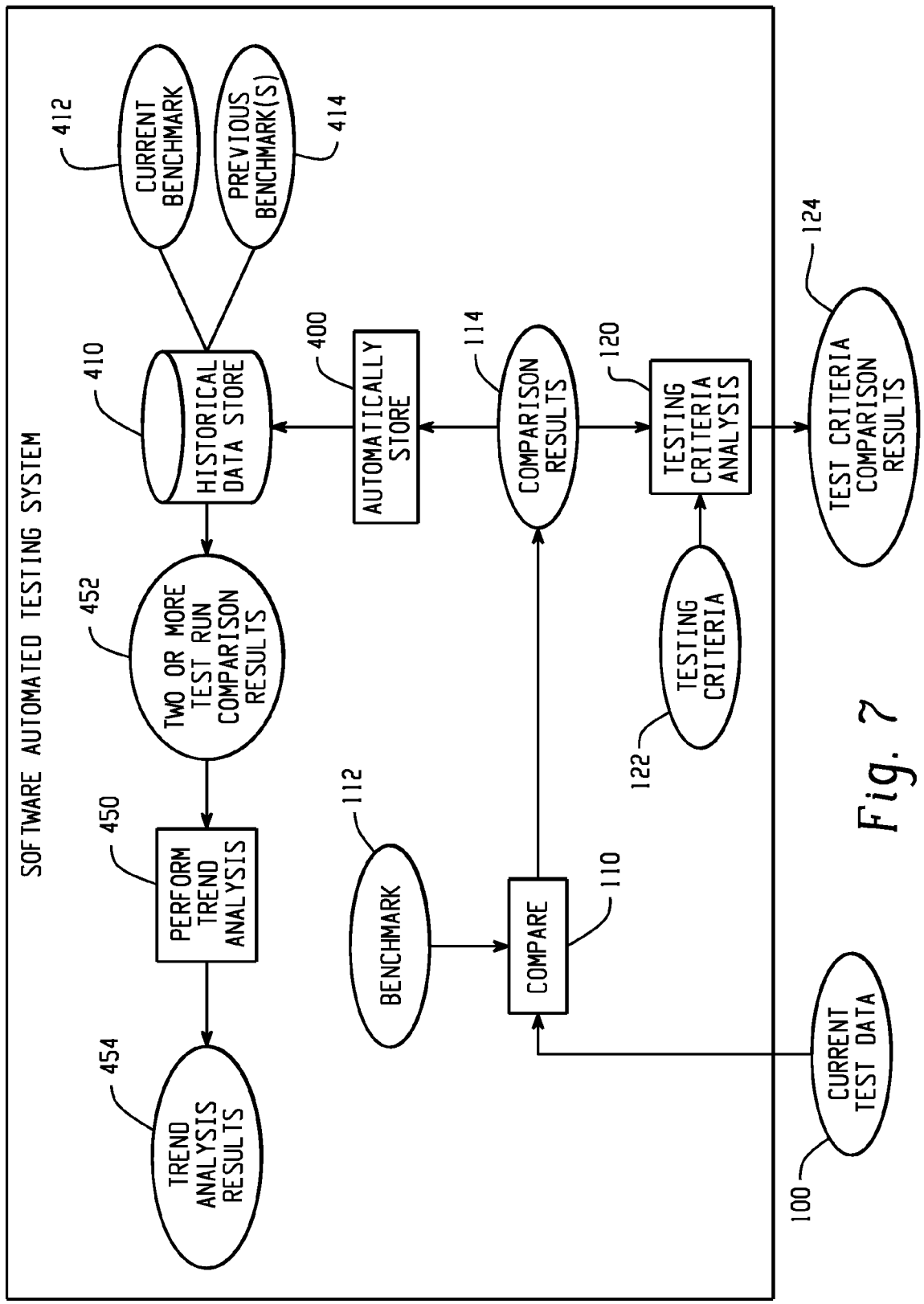
FIG. 7 is a block diagram depicting historical trend analysis.

FIG. 7 depicts a software automated testing system that can perform historical trend analysis 450 on test data selected from a historical data store (which can also include the current test data 100). From the historical data store, two or more test run comparison results 452 are selected. The software automated testing system performs historical trend analysis 450 on the two or more test run comparison results 452 and generates historical trend analysis results 454. The process enables a tester or other type user (e.g., manager) to track the performance characteristics of the system under test as a function of time and changing conditions (e.g., under a load of 10 users, under a load of 10000 users, etc.). This kind of historical trend analysis allows one to determine which of the many variables may be influential in the performance of the system under test.

Figure 8:
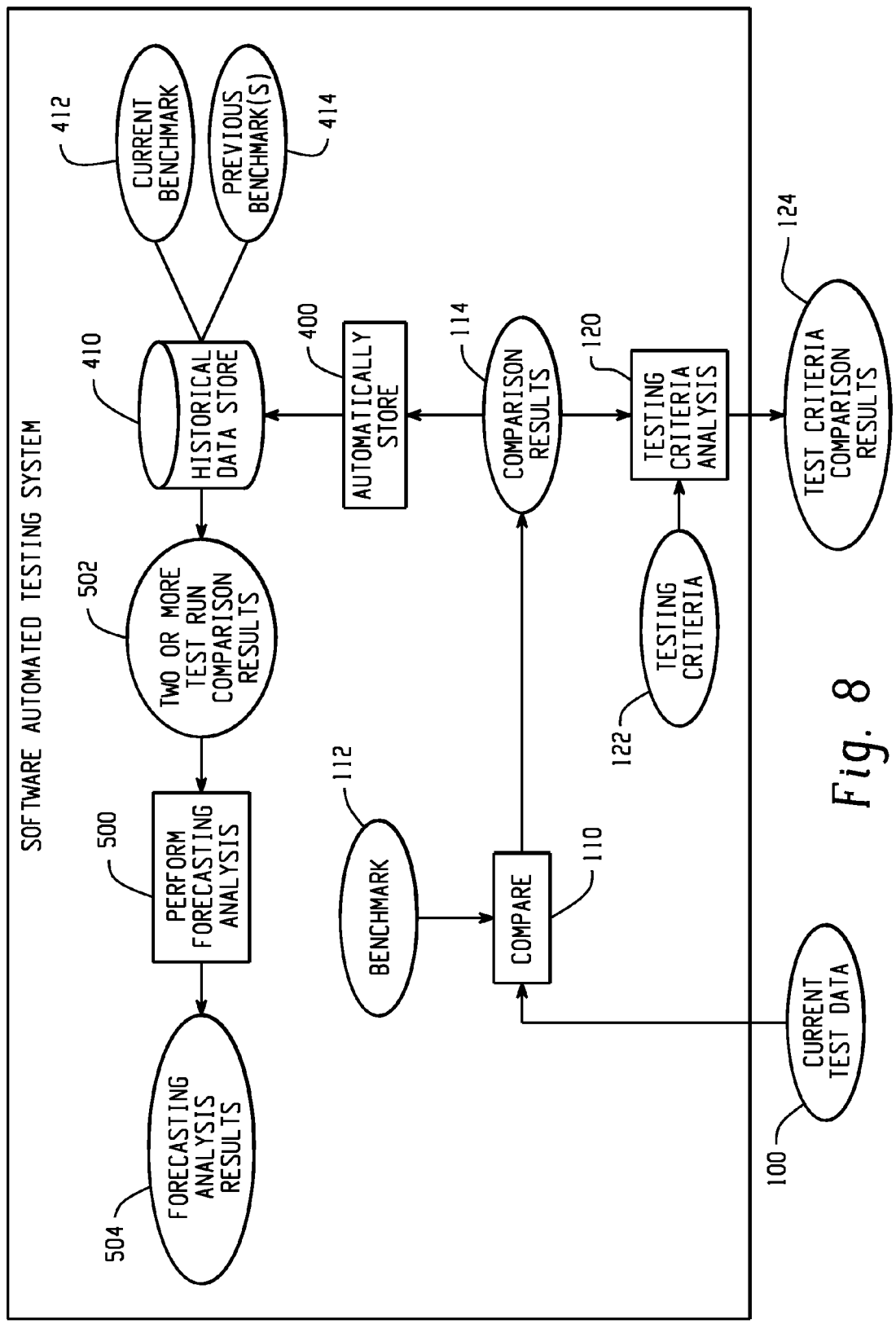
FIG. 8 is a block diagram depicting forecast analysis.

FIG. 8 shows a software automated testing system that has been configured for performing forecasting analysis 500 on test data selected from a historical data store 410. From the historical data store, two or more test run comparison results 502 are selected. The software automated testing system performs forecasting analysis 500 on the two or more test run comparison results 502 and generates forecasting analysis results 504. Calculations based on historical data permit forecasting of future performance characteristics of the system under test. This forecasting permits managers to predict future performance and estimate timeframes in which performance goals may be reached with at least some degree of accuracy and reliability.

Figure 9:
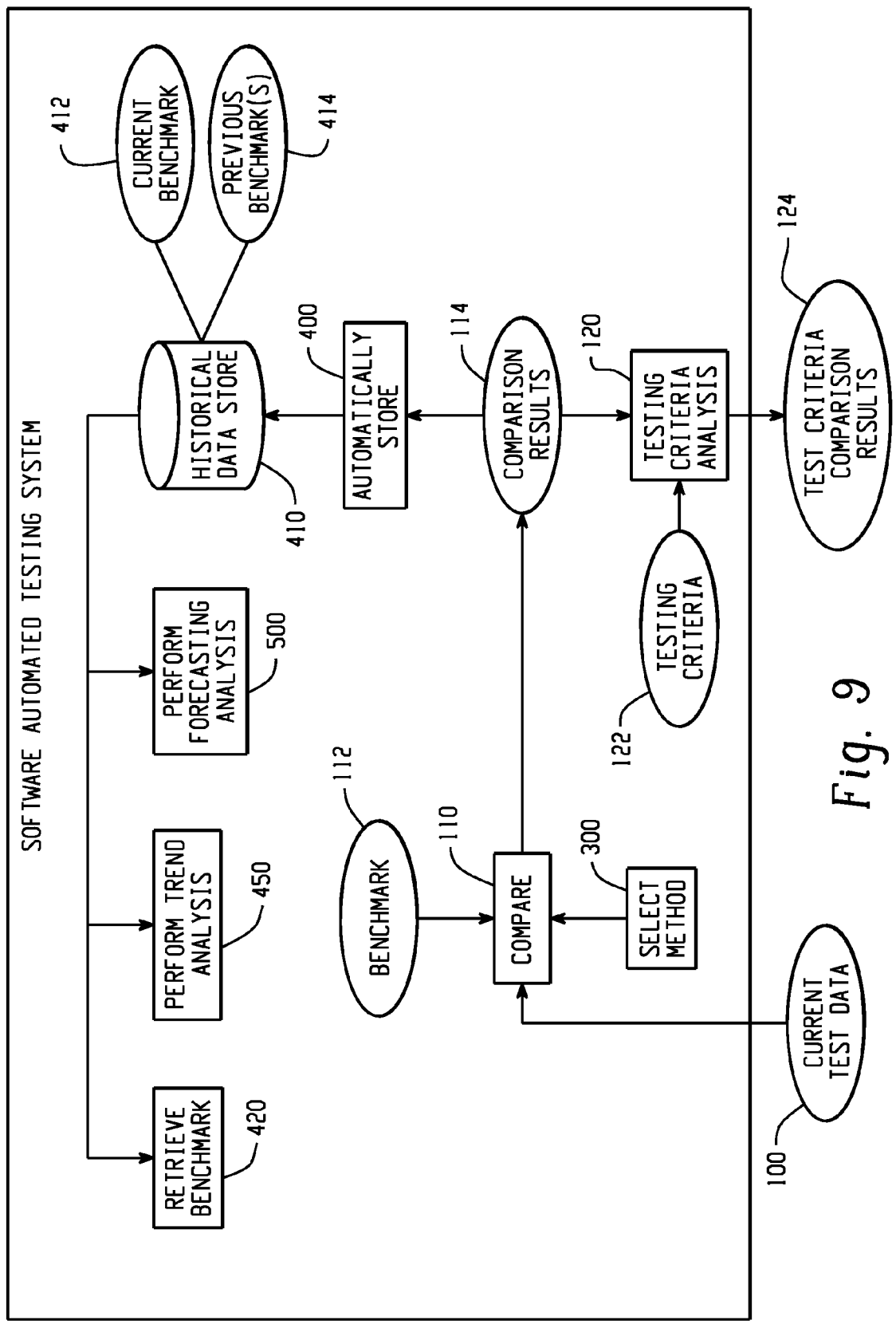
FIG. 9 is a block diagram depicting a software automated testing system being configured to use one or more of the testing components.

FIG. 9 shows that a software automated testing system can be configured to use one or more of the components described herein. For example, a system can be configured as shown in FIG. 9 to select a testing comparison method via process 300, to retrieve benchmark data via process 420, to perform historical trend analysis 450, and to perform forecasting analysis 500. More specifically, a method of comparison can be first selected via process 300. Current test data is then compared against the benchmark according to the selected method of comparison. The comparison results are then automatically stored in the historical data store. From the comparison results stored in the historical data store, a user can retrieve benchmark data 420 to perform subsequent comparisons via process 110, to perform historical trend analysis 450, and/or to perform forecasting analysis 500.

FIG. 10 depicts an example of an operational scenario for creating and storing benchmark data for the first time (i.e., this is the first test run). The process starts after the first performance test has concluded. Raw data 600 is extracted from the test data and the raw data is filtered 610 so that it can be placed in a format for analysis by a software automated testing system. This filtered raw data is used to create a benchmark 620. The new benchmark then is automatically stored as historical data 630 alongside previous benchmarks for the application(s) being tested.

FIG. 11 shows an operational scenario for analyzing test data results of tests performed after the first test. The operational scenario starts after a performance test has concluded. Raw data 650 is extracted from the test data and the raw data is filtered 660 for use in the analysis portion 670 of the process. The analysis portion 670 can optionally output results 690 and then exit 700 and/or it can send output to be stored as historical data 680. The historical data 680 can be used to analyze the performance of the application over a period of time. If the user wants to go a step further, they can choose to generate a forecast of future testing performance. A report is then generated in a user defined format.

Figure 12:
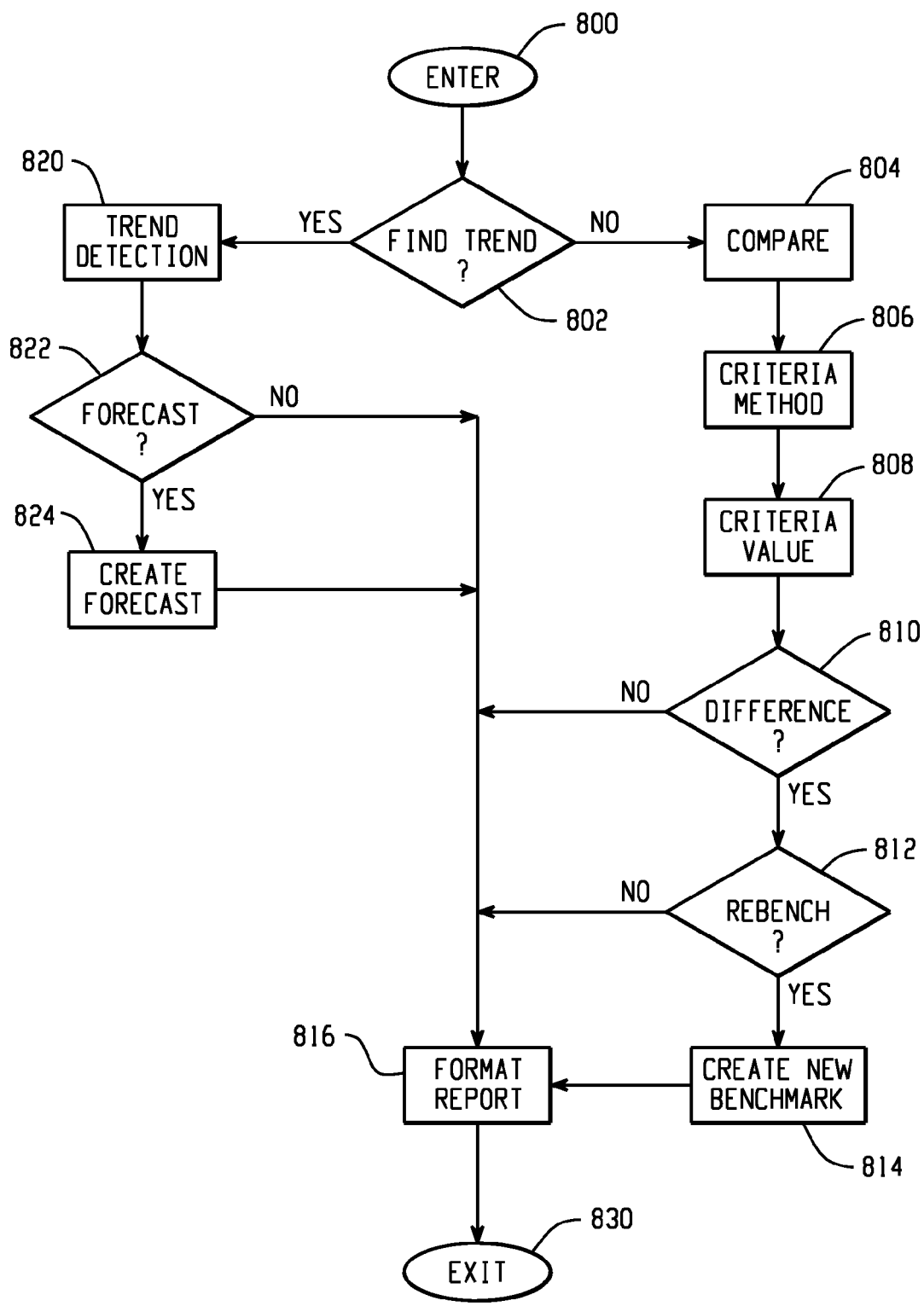
FIG. 12 is a flowchart of an example of a software testing operational scenario.

FIG. 12 provides an example of another operational scenario for analyzing test data. The operational scenario starts at 800. A decision to find a trend is made at 802. If the decision to find a trend is "No" (e.g., the user decides not to perform trending analysis or there is not a significant amount of historical data to do the trending analysis), then processing proceeds to begin the comparison analysis at 804, using the testing comparison criteria method specified at 806. Performance acceptability criteria values (e.g., acceptable performance deviations) are provided at 808 by a user and/or a data store containing the criteria values. At 810, any differences are determined, and if there are one or more differences, processing proceeds to a decision whether to rebench or not at 812. If the decision is not to rebench, processing proceeds to format the analysis report at 816 and provide it to a user or store it for use by a software program. If the decision is to rebench, then processing proceeds to step 814 wherein a new benchmark is created. In this operational scenario, the last result is used as the new benchmark, and the previous benchmark is stored in the historical data store. Processing then proceeds to format and provide a report at 816. Furthermore, a report is formatted and provided if there was not a difference as determined at 810.

If the decision to find a trend 802 is "Yes," then processing proceeds to step 820 for historical trend detection and analysis. Historical trend detection and analysis can be accomplished by many different techniques, such as through linear regression to fit a curve to the data points. Step 822 examines whether forecasting is desired. If not, then processing proceeds to format and provide the report at 816. If the decision is to forecast, then the forecast is created at 824 and processing proceeds to step 816 before the operational scenario ends at exit block 830. Forecasting can be accomplished by many different techniques, such as time series moving average, which uses historical data as the basis for predicting future outcomes.

Figure 13:
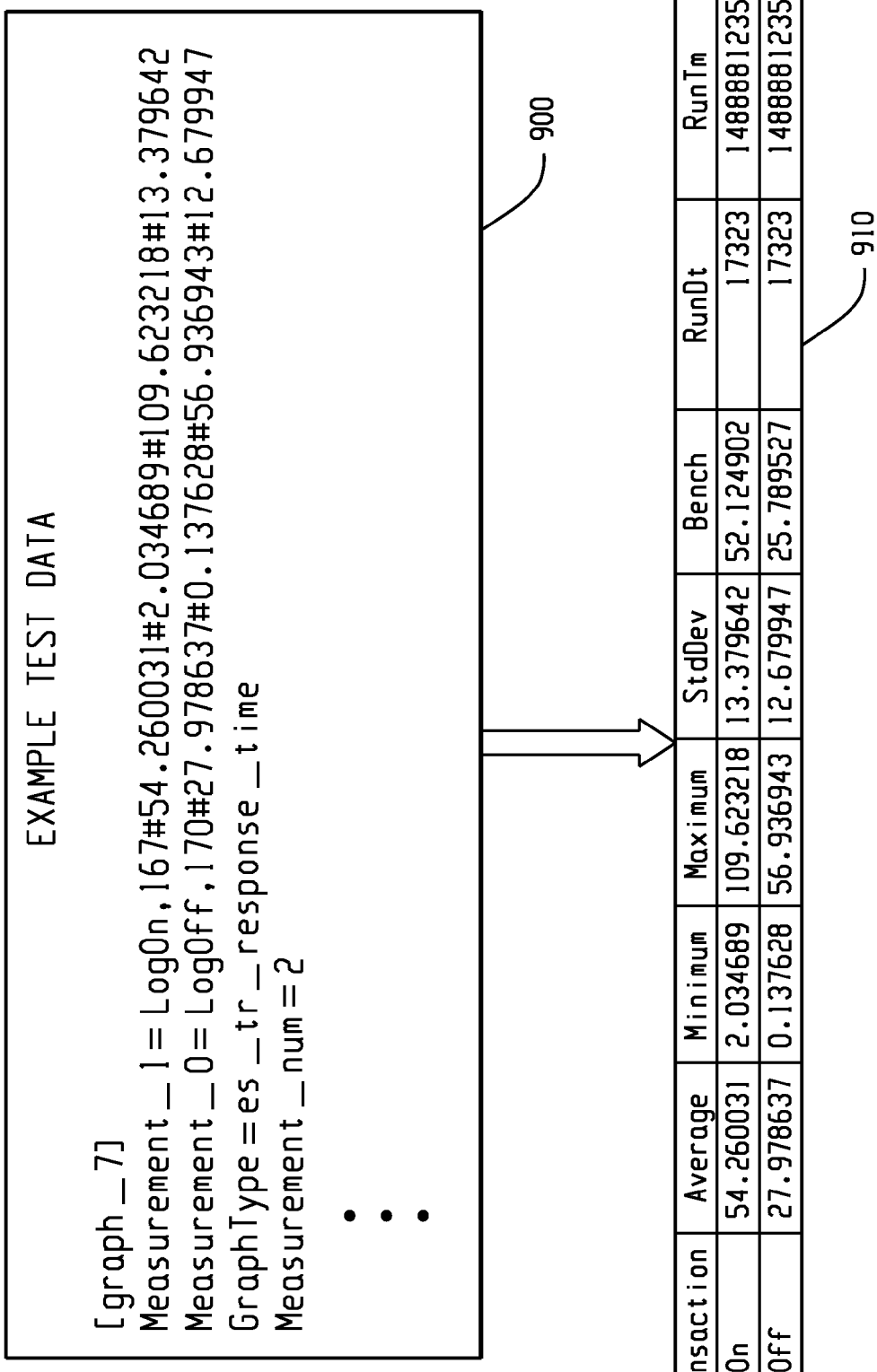
FIG. 13 is an example of raw test data.

FIG. 13 provides an example of raw test data 900 being filtered into the format shown at 910. More specifically, example test data 900 contains five lines of data. The first line, in square brackets, constitutes a title for the data. Below the title are two lines of raw data, beginning with "Measurement_1 . . ." and "Measurement_0 . . .", respectively. In this example, Measurement_1 represents a "LogOn" event, and Measurement_0 represents a "LogOff" event. In each line, raw data values are shown separated by "#" symbols. There are four raw data values in this example test data, corresponding to the average, minimum, maximum, and standard deviation. The third line provides the type of graph in which the data will be displayed. Finally, the fourth line shows the number of measurements.

The parsed data is shown in a table at 910. The first row corresponds to Measurement_1 and the second row corresponds to Measurement_0. The type of transaction is shown in the second column. Here, the transaction names are "LogOn" and "LogOff." The four raw data values, average, minimum, maximum, and standard deviation, can be found in the succeeding columns. Based on these inputs, a bench value is calculated and is shown in the "Bench" column. The test run date and time stamps are shown in the remaining two columns.

Figure 14:
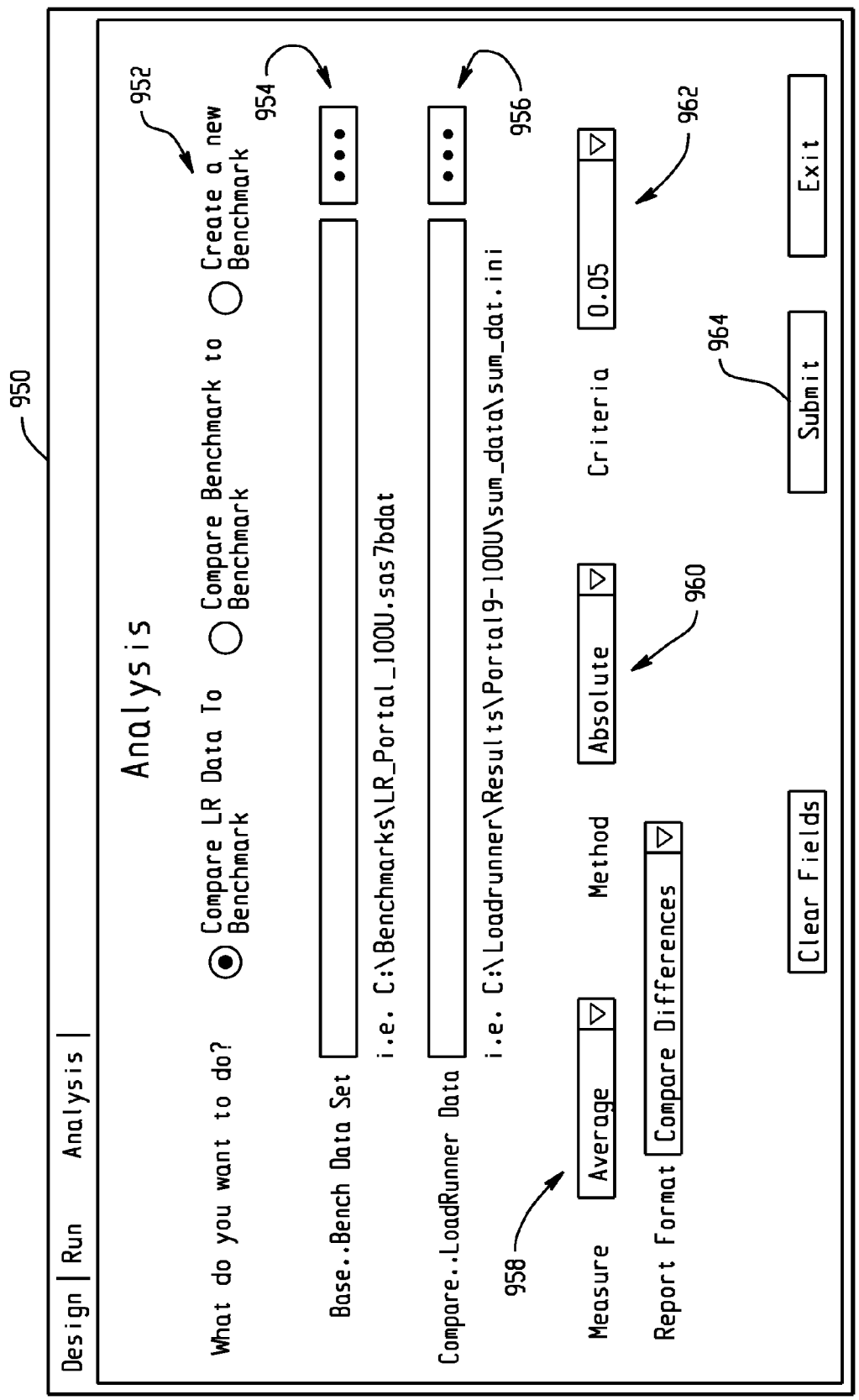
FIG. 14 shows an example graphical user interface for interacting with a user.

FIG. 14 shows an example graphical user interface 950 (GUI 950) for interacting with a user. At 952, a user can select the operation the user wants the system to perform. In this example, the user's options are "Compare LR Data to Benchmark," "Compare Benchmark to Benchmark," and "Create a new Benchmark" (wherein LR stands for LoadRunner®). In this example, the user has selected "Compare LR Data to Benchmark."

At 954 is an input area for a Base Bench Data Set, which the user can select as a baseline comparison to the new test data. Beneath the input area is an example for the path of a base bench data set, "C.\Benchmarks\LR_Portal_100U.sas7bdat." At 956 is an input area for Compare LoadRunner Data. The user can select LoadRunner data for comparison. Beneath the input area is an example for the path of LoadRunner data, "C.\Loadrunner\Results\Portal9-100U\sum_data\sum_dat.ini." At 958, the data to be measured can be selected. Here, the "Average" is selected. At 960, the method of comparison can be selected. In this example, the "Absolute" method of comparison is selected. At 962, a testing criteria value can be specified (e.g., "0.05"). At 964, the report format can be selected. In this example, the "Compare Differences" is the selected report format. At 966, the user can elect to submit the data that was input through the GUI 950, thereby starting the selected comparison operation.

FIG. 15 shows an example of an analysis 1000 that compares benchmark data to raw data. The values are compared in a table, with columns for the Transaction, Benchmark Average, Raw Data Average, Difference, and % Difference. Difference is determined by the formula (x−y), where x is the Raw Data Average and y is the Benchmark Average. Thus, the Difference shown in this example is an absolute difference. Shown in the far right column is % Difference, which is determined by the formula (x−y)/y, where x is the Raw Data Average and y is the Benchmark Average.

FIG. 16 shows an example of historical data analysis 1100, containing details for portal log on transaction data statistics. In the left-most column are dates of the test runs and the testing analysis, covering the time period from July 24th to August 1st. For each Date, the Average, Minimum, Maximum, and Standard Deviation are provided.

Figures 17, 18:
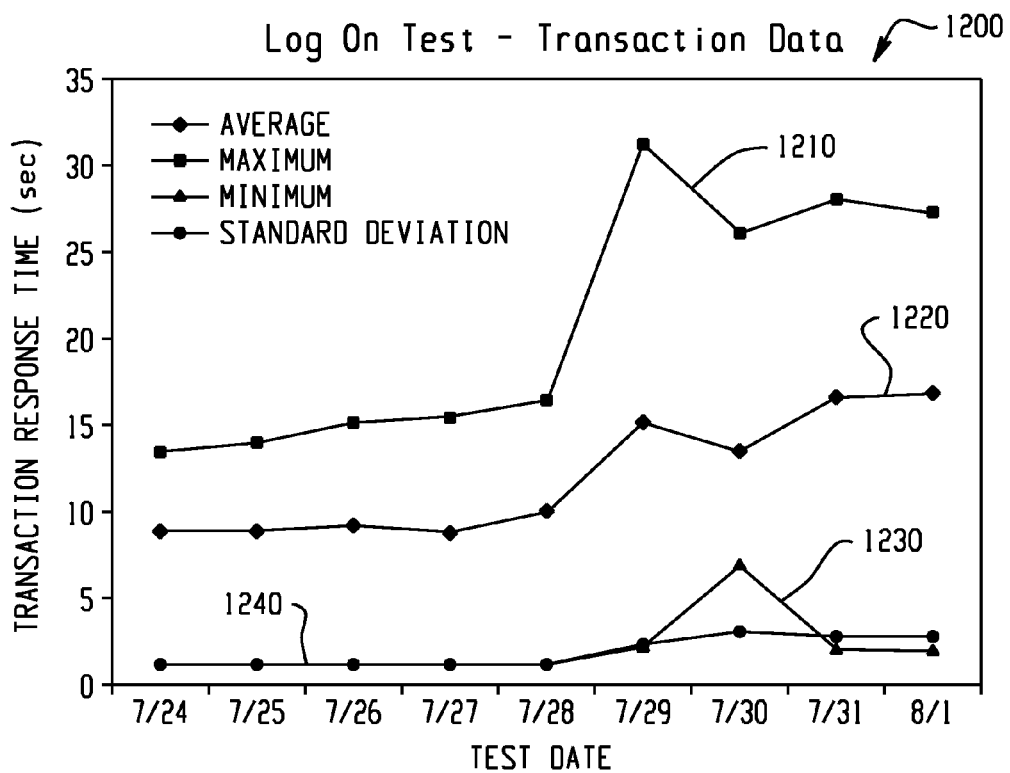
FIG. 17 shows a graph of the log on test data presented in FIG. 16.
FIG. 18 shows another example of historical data analysis, containing system resources statistics.

FIG. 17 shows a graph 1200 of the log on test data presented in FIG. 16. On the x-axis is the Test Date. For each Test Date, the Maximum 1210, Average 1220, Minimum 1230, and Standard Deviation 1240 are plotted on the y-axis, thereby providing historical testing trend information to a user.

FIG. 18 shows another example of historical data analysis 1300, related to system resources statistics. In the left-most column are Dates for benchmark data which cover the time period from July 24th to August 1st. For each Date, Processor, Handle Count and Thread Count are recorded.

Figure 19:
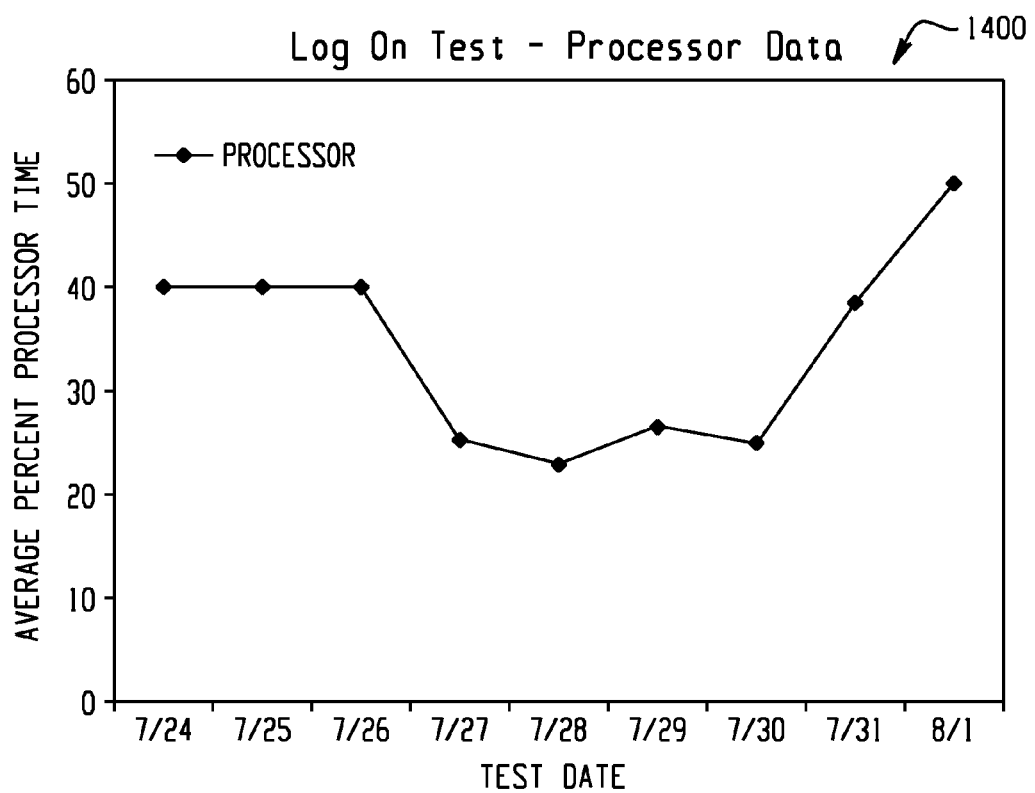
FIG. 19 shows a graph corresponding to the processor data presented in FIG. 18.

FIG. 19 shows a graph 1400 corresponding to processor data presented in FIG. 18. On the x-axis is the Test Date. For each Test Date, the Processor Data is plotted on the y-axis, thereby providing historical testing trend information to a user.

Figure 20:
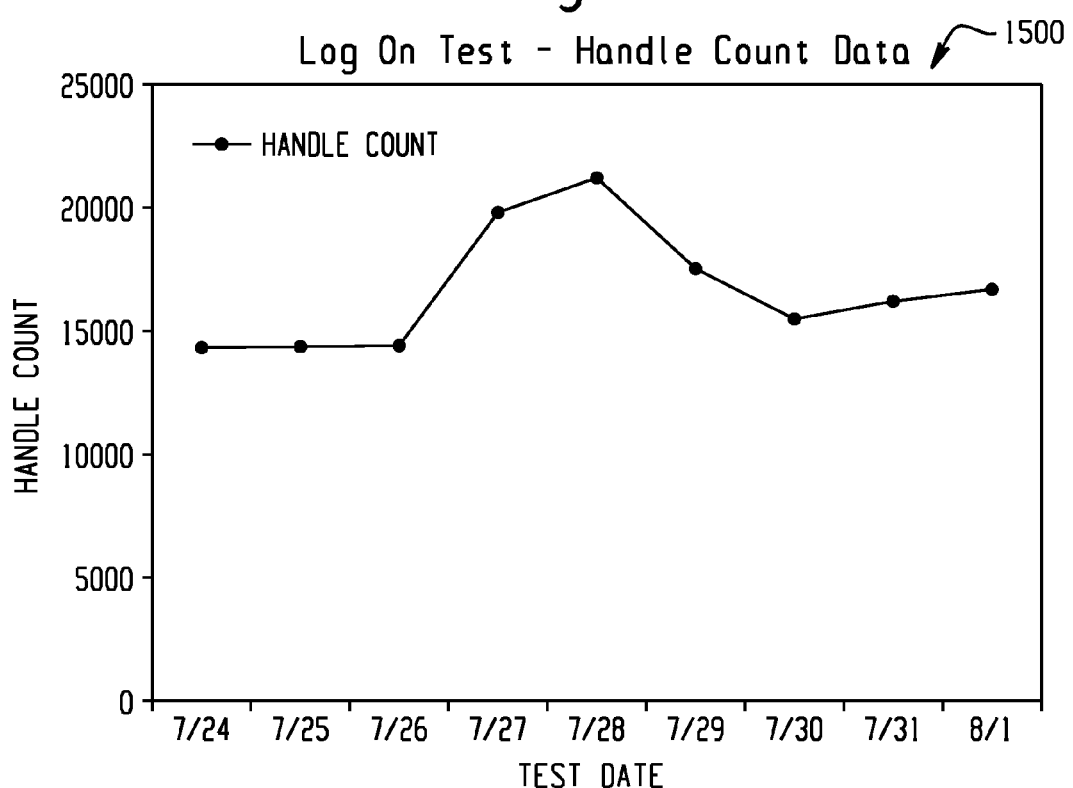
FIG. 20 shows a graph corresponding to the handle count data presented in FIG. 18.

FIG. 20 shows a graph 1500 corresponding to handle count data presented in FIG. 18. On the x-axis is the Test Date. For each test date, the handle count is plotted on the y-axis, thereby providing historical testing trend information to a user.

Figure 21:
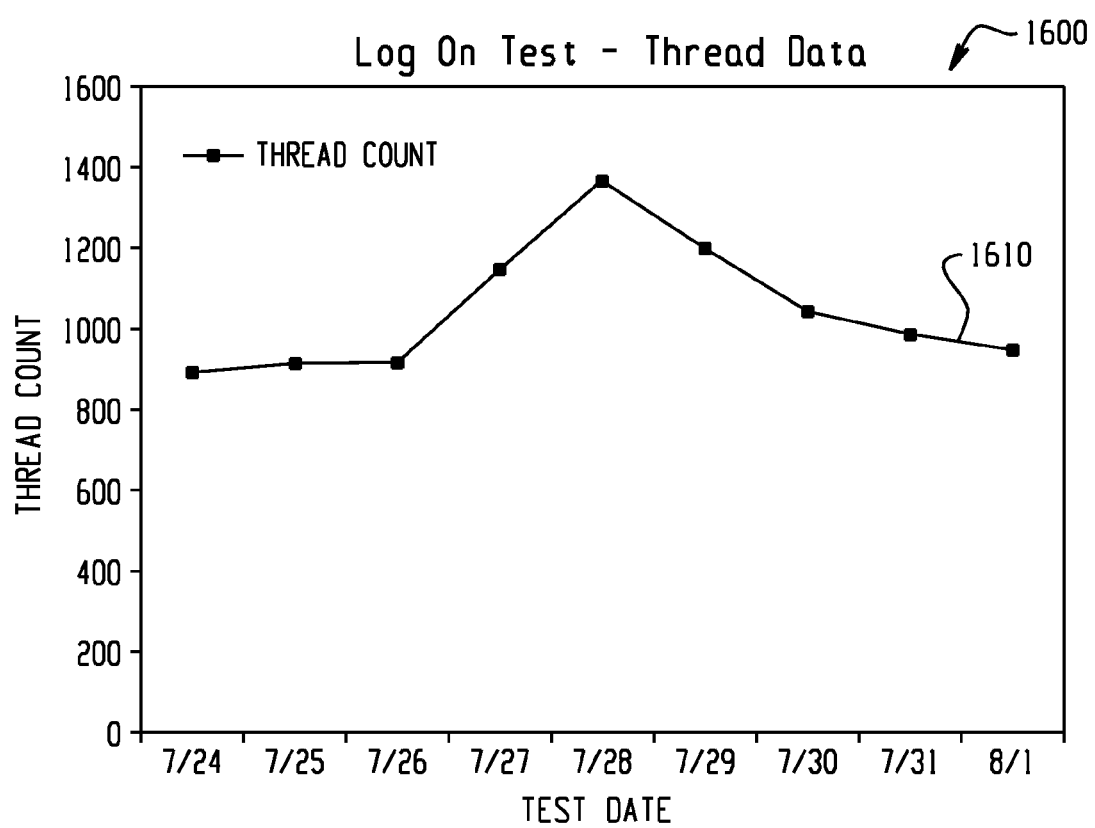
FIG. 21 shows a graph corresponding to the thread data presented in FIG. 18.

FIG. 21 shows a graph 1600 corresponding to thread data presented in FIG. 18. On the x-axis is the Test Date. For each Test Date, the Thread Count 1610 is plotted on the y-axis, thereby providing historical testing trend information to a user.

Figure 22:
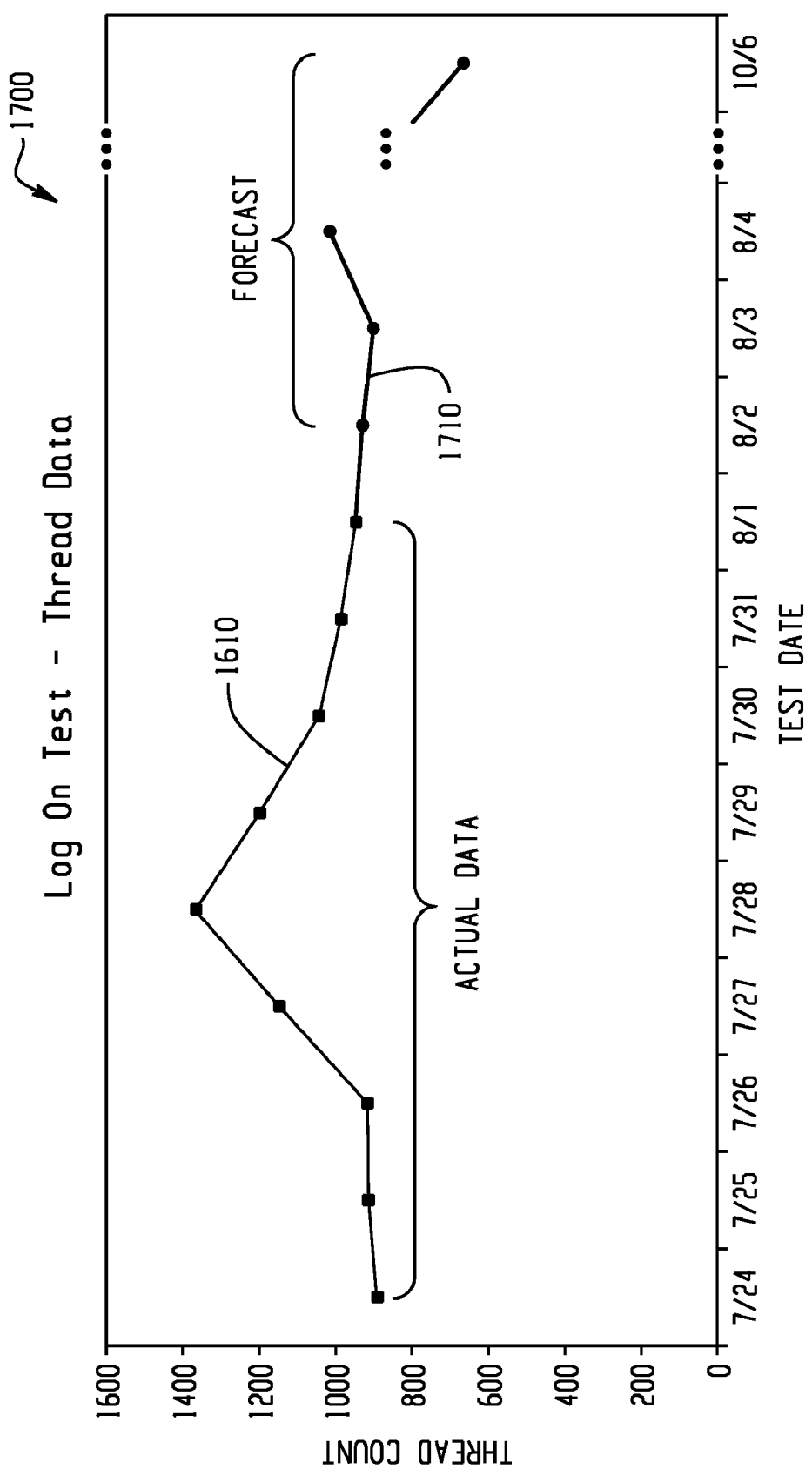
FIG. 22 shows an example of a graph that includes a forecast of future performance values.

FIG. 22 shows an example of a graph 1700 that includes a forecast 1710 of predicted future performance values. On the x-axis is the Test Date. For each Test Date, i.e., July 24th through August 1st, the Thread Count 1610 is plotted on the y-axis. Thread Count forecasts 1710 are shown for future Dates, i.e., August 2nd through October 6th. Many different forecasting methods can be used, such as time series moving average, which uses historical data as the basis for predicting future outcomes.

Figure 23:
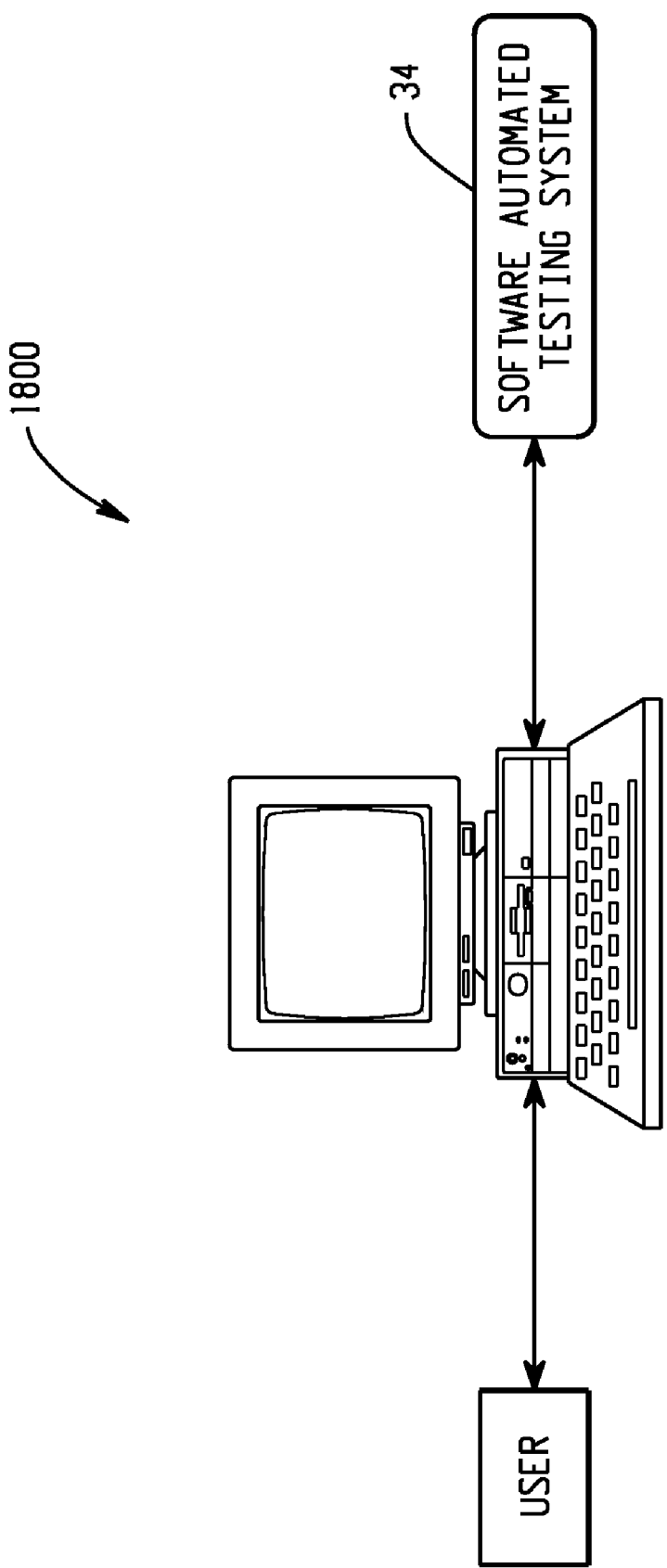
FIG. 23 is a block diagram depicting a single general purpose computer utilizing a software automated testing system for testing software application(s).

While examples have been used to disclose the invention, including the best mode, and also to enable any person skilled in the art to make and use the invention, the patentable scope of the invention is defined by claims, and may include other examples that occur to those skilled in the art. Accordingly the examples disclosed herein are to be considered non-limiting. As an illustration, the systems and methods may be implemented on various types of computer architectures, such as for example on a single general purpose computer or workstation, or on a networked system, or in a client-server configuration, or in an application service provider configuration. As an illustration, FIG. 23 shows a single general purpose computer utilizing a software automated testing system 34 for testing software application(s) that also can reside on the general purpose computer.

Furthermore, systems and methods disclosed herein can be used to accomplish functional testing in addition to performance testing. Functional testing involves whether functions in a software application under test actually performed their intended functions or not—that is, did a particular function work or did it not work (e.g., did a particular function return the correct value based upon a certain set of inputs). Performance testing on the other hand typically deals with more variables and multiple levels or shades of what might be considered acceptable performance. For example, performance testing may focus on how long a particular software function took to complete its task. Different variables (e.g., statistical variables) can be derived to analyze whether performance of a particular function is acceptable. Because the values of the variables can change over time such as due to the software application being modified and improved, historical trend analysis and forecasting can be performed on performance-related metrics.

It is further noted that the systems and methods may include data signals conveyed via networks (e.g., local area network, wide area network, internet, combinations thereof, etc.), fiber optic medium, carrier waves, wireless networks, etc, for communication with one or more data processing devices. The data signals can carry any or all of the data disclosed herein that is provided to or from a device.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to carry out the methods and systems described herein.

The systems' and methods' data (e.g., associations, mappings, etc.) may be stored and implemented in one or more different types of computer-implemented ways, such as different types of storage devices and programming constructs (e.g., data stores, RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, etc.) that contain instructions (e.g., software) for use in execution by a processor to perform the methods' operations and implement the systems described herein.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

The invention claimed is:

1. A computer-implemented method for testing software applications, comprising:
   receiving, using one or more data processors, test data results generated during a software application test that determines whether the software application performed intended functions;
   retrieving, using the one or more data processors, benchmark test data from a data store;
   determining, using the one or more data processors, a test data difference by comparing the test data results with the benchmark test data;
   identifying, using the one or more data processors, a test deviation by applying a pre-determined performance criteria to the test data difference, wherein the test deviation identifies a degradation of performance of the software application, and wherein the performance criteria includes pre-specified acceptable deviations or unacceptable deviations between the test data results and the benchmark test data;
   receiving, using the one or more data processors, subsequent test data results;
   generating, using the one or more data processors, a forecast using one or more statistical values associated with the test data results and the subsequent test data results, wherein the forecast corresponds to a future performance of the software application;
   using, using the one or more data processors, the forecast to predict when the future performance of the software application will resolve the test deviation, wherein resolving includes satisfying the pre-determined performance criteria; and providing, using the one or more data processors, the prediction for display on a graphical interface.

2. The computer-implemented method of claim 1, further comprising:
   receiving an evaluation method, wherein the evaluation method is used to compare the test data results with the benchmark test data.

3. The computer-implemented method of claim 2, wherein the evaluation method is selected from a plurality of candidate evaluation methods.

4. The computer-implemented method of claim 3, wherein the candidate evaluation methods include an absolute difference evaluation method, a percentage difference evaluation method, or a relative difference evaluation method.

5. The computer-implemented method of claim 1, further comprising:
   storing the test data results in a historical data store;
   receiving new test data results generated during a new software application test;
   retrieving the stored test data results, wherein the test data results are used as new benchmark test data;
   determining a new test data difference by comparing the new test data results with the new benchmark test data; and
   identifying a new test deviation by applying the pre-determined performance criteria to the new test data difference.

6. The computer-implemented method of claim 1, further comprising:
   plotting the forecast corresponding to the future performance of the software application on a graph.

7. The computer-implemented method of claim 1, wherein the test data results are filtered before being compared with the benchmark test data.

8. The computer-implemented method of claim 1, wherein the statistical values include mean, standard deviation, minimum, and maximum values.

9. A computer-implemented system for testing software applications, comprising:
   one or more data processors;
   one or more computer-readable storage mediums containing instructions configured to cause the one or more processors to perform operations including:
      receiving test data results generated during a software application test that determines whether the software application performed intended functions;
      retrieving benchmark test data from a data store;

determining a test data difference by comparing the test data results with the benchmark test data;

identifying a test deviation by applying a pre-determined performance criteria to the test data difference, wherein the test deviation identifies a degradation of performance of the software application, and wherein the performance criteria includes pre-specified acceptable deviations or unacceptable deviations between the test data results and the benchmark test data;

receiving subsequent test data results;

generating a forecast using one or more statistical values associated with the test data results and the subsequent test data results, wherein the forecast corresponds to a future performance of the software application;

using the forecast to predict when the future performance of the software application will resolve the test deviation, wherein resolving includes satisfying the pre-determined performance criteria; and providing the prediction for display on a graphical interface.

10. A computer-program product for testing software applications, tangibly embodied in a machine-readable non-transitory storage medium, including instructions configured to cause a data processing apparatus to:

receive test data results generated during a software application test that determines whether the software application performed intended functions;

retrieve benchmark test data from a data store;

determine a test data difference by comparing the test data results with the benchmark test data;

identify a test deviation by applying a pre-determined performance criteria to the test data difference, wherein the test deviation identifies a degradation of performance of the software application, and wherein the performance criteria includes pre-specified acceptable deviations or unacceptable deviations between the test data results and the benchmark test data;

receive subsequent test data results;

generate a forecast using one or more statistical values associated with the test data results and the subsequent test data results, wherein the forecast corresponds to a future performance of the software application;

use the forecast to predict when the future performance of the software application will resolve the test deviation, wherein resolving includes satisfying the pre-determined performance criteria; and provide the prediction for display on a graphical interface.

* * * * *